No. 707,683. Patented Aug. 26, 1902.
H. F. FARWELL.
ANCHORING POST.
(Application filed Aug. 1, 1901.)
(No Model.)
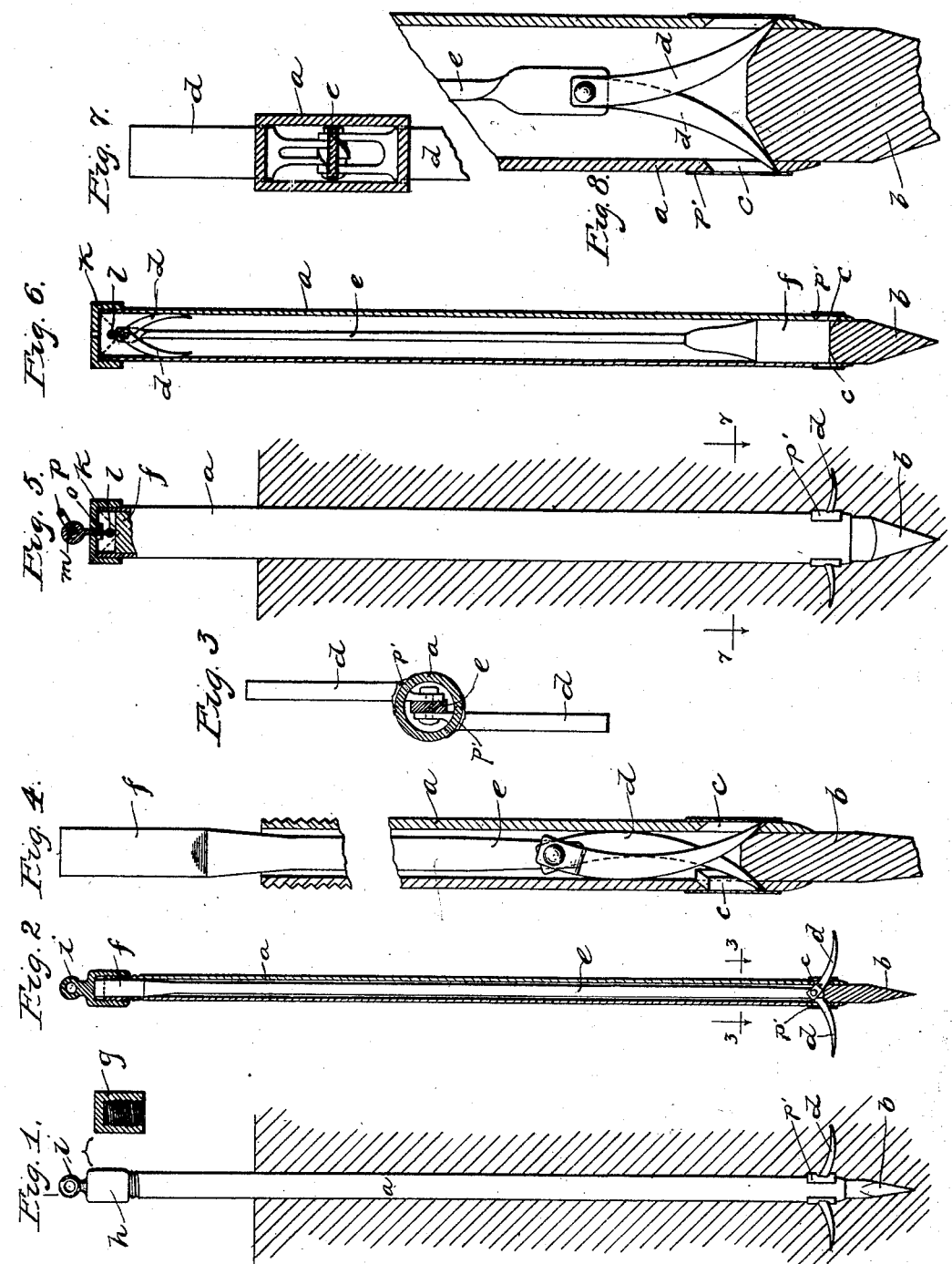
Witnesses:
Harvey L. Hanson.
Max W. Zabel.
Inventor:
Hart F. Farwell.
By Charles A. Brown Cragg & Belfield
Attorneys.

UNITED STATES PATENT OFFICE.

HART F. FARWELL, OF ASTORIA, ILLINOIS, ASSIGNOR TO COUNTRY HOME TELEPHONE MANUFACTURING COMPANY, OF CHICAGO, ILLINOIS, A CORPORATION OF ILLINOIS.

ANCHORING-POST.

SPECIFICATION forming part of Letters Patent No. 707,683, dated August 26, 1902.

Application filed August 1, 1901. Serial No. 70,506. (No model.)

*To all whom it may concern:*

Be it known that I, HART F. FARWELL, a citizen of the United States, residing at Astoria, in the county of Fulton and State of Illinois, have invented a certain new and useful Improvement in Anchoring-Posts, (Case No. 1,) of which the following is a full, clear, concise, and exact description, reference being had to the accompanying drawings, forming a part of this specification.

My invention relates to anchoring-posts that are to be driven into the ground for the purpose of securing wire or rope thereto, the invention being of particular service in connection with the construction of telegraph and telephone lines where the wire is to be engaged with anchoring-posts, so that it may be stretched along its way. Heretofore a variety of devices have been devised to act as anchoring-posts; but those in commercial use have been unsatisfactory, because of the time required to place them in position and the insecure hold they have upon the surrounding earth.

In accordance with my invention I employ a post that is preferably slender, so as to readily penetrate the earth, the post being preferably of tubular construction and containing retaining means passed through the post after it has been driven the required distance into the ground to constitute a lateral obstruction preventing the vertical displacement of the post. I do not, however, wish to be limited to this preferred embodiment of the invention, as other embodiments may be devised without departing from the spirit thereof. The form of retaining means that I prefer to employ consists in a claw or a plurality of claws mounted upon a bar extending through the bore of the tube and provided at its upper end with an enlargement constituting a butt that may project through the top of the tube to be in position to be struck by a hammer or maul to drive the bar downwardly and force the claws outwardly, a cam device being provided at the bottom of the tube for engagement with the claws, whereby they are guided into positions transverse to the tube. The upper end of the tubular post may be provided with removable caps, one constituting a hammer-cap, whereby the post may be driven into position, and the other an anchoring-cap, provided with an eye or other suitable means of attachment to enable the wire or rope to be anchored to the post. The hammering-cap is removed after the post has been driven into place to permit the maul to strike the bar carrying the claws, after which the anchoring-cap is placed. When the post is being driven into the ground, the bar carrying the claws is preferably reversed to place the claws at the top of the tube, the butt-end of the bar carrying the claws then serving to prevent the admission of dirt through the openings in the tube into the interior thereof. The claws when thus placed at the top of the tube are also reversed in position, so that they will not project from the tube, whereby the hammering-cap may be secured in place upon the tube. I prefer to employ an anchoring-post that is rectangular or oblong in cross-section, so that the claws or blades may be made much wider to secure firm engagement with the soil, and thereby prevent a withdrawal of the post.

I will explain my invention more fully by reference to the accompanying drawings, illustrating the preferred embodiments thereof, in which—

Figure 1 is a side elevation of an anchoring-post constructed in accordance with the invention, shown inserted within the earth, the claws having been thrust outwardly to engage the surrounding earth to prevent the withdrawal of the post, the hammering-cap being shown to one side of the post. Fig. 2 is an axial sectional view of the structure illustrated in Fig. 1. Fig. 3 is a plan view on line 3 3 of Fig. 2. Fig. 4 is an enlarged elevational view of the structure illustrated in Figs. 1, 2, and 3, the post being shown in section, while the claws are indicated in the position they occupy preparatory to being thrust through the apertures in the tube. Fig. 5 is a side elevation of a modified form of anchoring-post. Fig. 6 is a sectional elevation of the structure of Fig. 5, illustrating the relative positions of the parts before the claws are brought into engagement with the soil, the bar carrying the claws being reversed. Fig. 7 is a sectional plan view on line 7 7 of Fig. 5. Fig. 8 is a detailed sectional view of the oblong anchoring-post, illustrating the position the claws occupy in readiness to be passed through the apertures in the tube.

Like parts are indicated by similar characters of reference throughout the different figures.

The post $a$ is of tubular construction and may be circular in cross-section, as illustrated in Figs. 1 to 4, inclusive, or rectangular or oblong in cross-section, as illustrated in Figs. 5 to 8, inclusive.

The post or tube $a$ is provided at its lower end with a penetrating point $b$, composed, preferably, of iron, that is welded to the post or otherwise made to form a continuation thereof. The tubular post is provided at its lower end with a number of apertures $c$, corresponding to the number of blades or claws $d$ that are to be extended transversely of the post into the soil. I prefer to employ more than one blade, although I do not wish to be limited to the number used. The blades are pivotally mounted at their inner ends upon a bar $e$, formed at its upper end with an enlargement $f$, constituting a butt to be struck by a maul.

There is preferably provided for such structures as illustrated in Figs. 1 to 4, inclusive, two caps that may be removably secured to the tubular post, the cap $g$ constituting a hammering-cap, while the cap $h$ constitutes an anchoring-cap. Where the tube $a$ is of circular cross-section, its upper end may be threaded to engage a corresponding thread formed upon the interior of each of these caps. The upper face of the hammering-cap $g$ is flat, while the anchoring-cap $h$ is provided with an eye $i$, to which the wire or rope that is to be anchored may be secured. In such structures as are illustrated in Figs. 5 to 8, inclusive, but one cap $k$ need be provided for each tubular post $a$. This cap is removably secured in place by means of a bolt $l$. The top of the cap is provided with an aperture through which an eye $m$ may be passed, the stem of the eye being threaded to engage the nut $o$, disposed beneath the cap, while a ring $p$ may be passed through the eye, to which ring the wire or rope that is to be anchored may be secured. When the cap is to serve its function as a driving-cap, the bolt $l$ is removed and the eye $m$ displaced by loosening the nut $o$, whereafter the said cap is replaced and secured in position by the bolt $l$, whereupon the post may be driven into the ground. After the post has been sufficiently driven into the ground the eye $m$, with its associated parts, may be replaced. The buttends of the bars $e$ are preferably of a size to entirely fill the bore of the hollow posts $a$. While the posts are being driven into the ground the bars $e$ are preferably reversed in position, so that the said butts will close the openings in the posts to prevent dirt from passing into the interior of the posts. This adjustment of the bar $e$ is illustrated in Fig. 6. To prevent the claws from projecting beyond the tube or post, they are folded close about the bar, the points of the claws being then between the ends of the bar. In this adjustment the post may be capped to be hammered into the soil. When the post has been driven within the soil to a sufficient distance, the bar is removed and reversed, the claws $d$ at the same time being reversed to occupy the position illustrated in Figs. 4 and 8 preparatory to forcing the claws into the soil surrounding the post. In this adjustment the butt-end of the post projects beyond the post, there then being no cap upon the post, as illustrated in Fig. 4. By striking this butt with a maul or hammer the bar is forced downwardly to press the claws laterally into the soil, the inner end of the point $b$ constituting a cam or guide that directs the claws in ther outward movement. The apertures in the post are in the manufacture of the device preferably covered with imperforate plates $p'$ of thin metal. In the initial use of the post when the claws are driven into the soil they also force a passage through these coverings to form holes therein that nicely accommodate the claws. After the claws have been forced in their lateral positions the post is provided with the anchoring cap or device for attachment with the wire or rope.

I prefer the construction illustrated in Figs. 5, 6, 7, and 8, as this construction enables me to use claws of greater width, thereby securing a more permanent anchorage. The claws employed in connection with the tube of oblong cross-section differ somewhat in construction from those employed in connection with the tube of circular cross-section, being bifurcated at their anchored ends, the bar $e$ being interposed between the bifurcated ends of the claws and twisted at its lower end at right angles to the major length of the bar, so that the claws may be closely assembled about the bar inside of the tube for the purpose of shipment or when the anchoring-post is not in its finally-adjusted position. The bar supporting the claws is preferably of such length that when the claws have been projected into the surrounding soil the upper end of the bar will engage the anchoring-cap to prevent the withdrawal of the claws into the interior of the tube.

It will be observed that the stop or abutment $h$ or $l$ for locking the rope and anchoring-claws have threaded or other interlocking engagement with the hollow post to prevent removal by longitudinal slippage.

It is obvious that changes may be made from the embodiments of the invention herein disclosed without departing from the spirit thereof, and I do not, therefore, wish to be limited to the precise details set forth; but,

Having thus described my invention, I claim as new and desire to secure by Letters Patent—

1. The combination with a hollow post, of a bar therein provided at one end with a claw and at the other end with an enlargement serving to fill the bore of the post and constituting a butt to be struck in forcing the claw into the surrounding soil, substantially as described.

2. The combination with a hollow post provided at its lower end with an aperture, of a covering for the said aperture, a bar located within the post, and a claw provided upon the bar and adapted by a movement of the bar to be forced through the said covering into the surrounding soil, substantially as described.

3. The combination with a hollow post, provided at its lower end with an aperture, of a bar in the post, a claw provided upon the bar and adapted to be forced through the said aperture, and an anchoring screw-cap for engagement with the upper end of the post, substantially as described.

4. The combination with a hollow anchor-post, provided at its lower end with an aperture, of a bar in the post, a claw provided upon the bar and adapted to be forced through the said aperture, and a screw-cap for engagement with the upper end of the post and provided with an aperture for engagement with a rope or cable, substantially as described.

5. A post comprising a tubular structure having its lower end provided with an earth-penetrating device and also provided with an aperture and made hollow throughout its length above such device, a bar or rod arranged within said tubular structure and provided at its lower end with a claw or like device adapted for projection through said aperture in the post, the said bar or rod extending to substantially the top of the post when the claw is projected, and means for engaging the bar or rod and locking the same in the post after the claw has been projected, substantially as set forth.

6. A tubular or hollow post, containing an anchoring device adapted for projection from the post into the earth and a stop or abutment having interlocking engagement with the post so as to be prevented from removal by longitudinal slippage and engaging the anchoring device to prevent the retraction of the anchoring device and means for attaching a rope or cable to the post, substantially as described.

In witness whereof I hereunto subscribe my name this 26th day of July, A. D. 1901.

HART F. FARWELL.

Witnesses:
GEORGE L. CRAGG,
HARVEY L. HANSON.